(12) United States Patent
Ishihara et al.

(10) Patent No.: US 10,451,180 B2
(45) Date of Patent: Oct. 22, 2019

(54) CONTROL DEVICE

(71) Applicant: AISIN AW CO., LTD., Anjo-shi, Aichi-ken (JP)

(72) Inventors: Yasuhiro Ishihara, Anjo (JP); Yasuhiko Kobayashi, Anjo (JP); Tetsuro Kuwano, Anjo (JP); Jin Izawa, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 128 days.

(21) Appl. No.: 15/735,323

(22) PCT Filed: Jul. 19, 2016

(86) PCT No.: PCT/JP2016/071130
§ 371 (c)(1),
(2) Date: Dec. 11, 2017

(87) PCT Pub. No.: WO2017/014216
PCT Pub. Date: Jan. 26, 2017

(65) Prior Publication Data
US 2018/0163857 A1    Jun. 14, 2018

(30) Foreign Application Priority Data

Jul. 21, 2015  (JP) ................................. 2015-143672

(51) Int. Cl.
*F16H 61/00* (2006.01)
*F16H 61/02* (2006.01)
(Continued)

(52) U.S. Cl.
CPC ..... *F16H 61/0251* (2013.01); *F16H 61/0021* (2013.01); *G05D 16/2013* (2013.01);
(Continued)

(58) Field of Classification Search
CPC ............. F16H 61/0251; F16H 61/0021; F16H 2061/0078; F16H 2061/0255;
(Continued)

(56) References Cited

U.S. PATENT DOCUMENTS 5,790,364 A * 8/1998 Mikami ............... H01H 47/325
361/152
2009/0005913 A1  1/2009 Fernandez et al.
(Continued)

FOREIGN PATENT DOCUMENTS

JP    H2-256981 A   10/1990
JP    H11-230400 A   8/1999
(Continued)

OTHER PUBLICATIONS

English Translation of KR100467497B1 (equivalent of KR20020021901A); http://translationportal.epo.org; Mar. 20, 2019 (Year: 2019).*

(Continued)

*Primary Examiner* — Roger L Pang
(74) *Attorney, Agent, or Firm* — Oliff PLC (57) ABSTRACT

A control device that includes an electronic control unit that is configured to: detect an actual current value flowing through the solenoid valve; receive a current command value and the actual current value detected and generate a primary command voltage value while feeding back the current command value on the basis of the actual current value; calculate a dither command voltage value to cause a periodic voltage oscillation; filter the actual current value detected to remove a frequency corresponding to a period of the dither command voltage value and output the filtered actual current value; generate a secondary command voltage value by superimposing the dither command voltage value generated on the primary command voltage value generated;

(Continued)

convert the secondary command voltage value generated into a PWM signal; and generate, on the basis of the PWM signal generated, an application voltage to be applied to the solenoid valve.

20 Claims, 3 Drawing Sheets (51) Int. Cl.
 *H01F 7/18* (2006.01)
 *G05D 16/20* (2006.01)
 *B60W 50/00* (2006.01)
(52) U.S. Cl.
 CPC ... *H01F 7/1844* (2013.01); *B60W 2050/0008* (2013.01); *B60W 2510/1075* (2013.01); *B60W 2710/1077* (2013.01); *F16H 2061/0078* (2013.01); *F16H 2061/0255* (2013.01); *H01F 2007/1866* (2013.01)
(58) Field of Classification Search
 CPC . B60W 2050/0008; B60W 2510/1075; B60W 2710/1077; G05D 16/2013; H01F 7/1844; H01F 2007/1866

USPC .......................................................... 701/60
See application file for complete search history.

(56) References Cited

U.S. PATENT DOCUMENTS

| | | | |
|---|---|---|---|
| 2009/0015980 A1* | 1/2009 | Fukano | F16K 31/0675 361/194 |
| 2009/0225489 A1 | 9/2009 | Lehner et al. | |
| 2014/0254058 A1 | 9/2014 | Suzuki et al. | |
| 2018/0328514 A1* | 11/2018 | Mizuno | F16K 31/002 |

FOREIGN PATENT DOCUMENTS

| | | | |
|---|---|---|---|
| JP | 2009-530167 A | | 8/2009 |
| JP | 2014-197655 A | | 10/2014 |
| KR | 20020021901 A | * | 3/2002 |

OTHER PUBLICATIONS

Oct. 18, 2016 International Search Report issued in International Patent Application No. PCT/JP2016/071130.

* cited by examiner

CONTROL DEVICE

BACKGROUND

This technology relates to a control device for electrically controlling a solenoid valve.

In automatic transmissions mounted, for example, on vehicles, shift speeds are achieved by forming transmission paths in accordance with the state of engagement of friction engagement elements, such as clutches and brakes. The state of engagement of the friction engagement elements is controlled by hydraulic pressure supplied to hydraulic servos thereof. The hydraulic pressure is commonly regulated by a linear solenoid valve provided in a hydraulic control device. The linear solenoid valve has a coil, and a current supplied to the coil drives a plunger (a movable iron piece) to control the position of a spool that regulates the hydraulic pressure, thus regulating the hydraulic pressure.

The current supplied to the linear solenoid valve is controlled by a control device (ECU). Specifically, the control device determines shifting on the basis of, for example, a vehicle speed and an accelerator operation amount, calculates a current value supplied to the linear solenoid valve on the basis of the determination, generates a PWM signal by PWM modulation of the current value, and controls an application voltage by driving switching elements with the PWM signal, thereby controlling the current flowing through the linear solenoid valve.

In the linear solenoid valve described above, when the current flowing through the coil reaches a steady state, the plunger and the spool become stationary accordingly. When the current is changed in order to move the spool, especially after a sliding friction is exerted by the coefficient of static friction on the spool, a delay in response may occur, and hydraulic responsiveness may become degraded. In a known approach to preventing the stationary state so as to improve the hydraulic responsiveness, the current is periodically oscillated with a dither period, i.e., the position of the spool is oscillated with the dither period (refer to Japanese Patent Application Publication No. 2014-197655).

SUMMARY

Incidentally, it is difficult to accurately control a linear solenoid valve using a current command value without feedback-controlling a target current command value by detecting an actual current value flowed through the linear solenoid valve. In this regard, according to Japanese Patent Application Publication No. 2014-197655, in order to cause the current supplied to the linear solenoid valve to oscillate with the dither period, a current value of a dither modulation amount that achieves the dither period is calculated and superimposed on the target current command value.

After the dither current value is added to the command current, feedback control is performed by using the actual current value flowed through the coil. However, since the actual current value has a phase lag of 90 degrees relative to a PWM signal and has the dither current value superimposed thereon, the feedback control is performed under conditions where there is a deviation between the command current and the actual current value having the phase lag. Therefore, it is difficult to achieve a target dither amplitude. This does not allow the spool to vibrate with a target amplitude, thus hindering improvement in the hydraulic responsiveness and making it impossible to effectively prevent the stationary state described above.

In order to achieve a target dither amplitude, complicated calculation of a current value of a dither amplitude that achieves the dither period needs to be performed by taking into account the phase lag in the feedback control, and the current value needs to be added to the command current value. This increases calculation load and requires increasing the size of a chip, such as a CPU, thus making it hard to reduce the cost of a control device.

An exemplary aspect of the disclosure provides a control device that reduces the amount of calculation so as to eliminate the need to increase the size of a chip, thus achieving a cost reduction.

A control device according to the present aspect electrically controls a solenoid valve and includes an electronic control unit that is configured to: detect an actual current value flowing through the solenoid valve; receive a current command value and the actual current value detected and generate a primary command voltage value while feeding back the current command value on the basis of the actual current value; calculate a dither command voltage value to cause a periodic voltage oscillation; filter the actual current value detected to remove a frequency corresponding to a period of the dither command voltage value and output the filtered actual current value; generate a secondary command voltage value by superimposing the dither command voltage value generated on the primary command voltage value generated; convert the secondary command voltage value generated into a PWM signal; and generate, on the basis of the PWM signal generated, an application voltage to be applied to the solenoid valve.

Thus, conversion into the primary command voltage value is performed by feeding back the current command value on the basis of the actual current value that flows through a coil, and the dither command voltage value having the dither modulation amount that achieves the dither period is superimposed on the primary command voltage value. This allows, while accurately controlling the linear solenoid valve, the dither command voltage value to be calculated without taking into account that the actual current value is fed back. As such, this reduces calculation load and eliminates the need to increase the size of a chip, such as a CPU, thus making it possible to achieve a cost reduction.

BRIEF DESCRIPTION OF THE DRAWINGS

FIG. 2 is a timing chart illustrating a current signal and a voltage signal that a dither period is superimposed on.

DETAILED DESCRIPTION OF EMBODIMENTS

An embodiment is described with reference to FIG. 1 to FIG. 3. First, the schematic structure of an automatic transmission 100 and the schematic structure of a control device 1 (hereinafter referred to as a "control unit") of the automatic transmission 100 are described with reference to FIG. 1.

Figure 1:
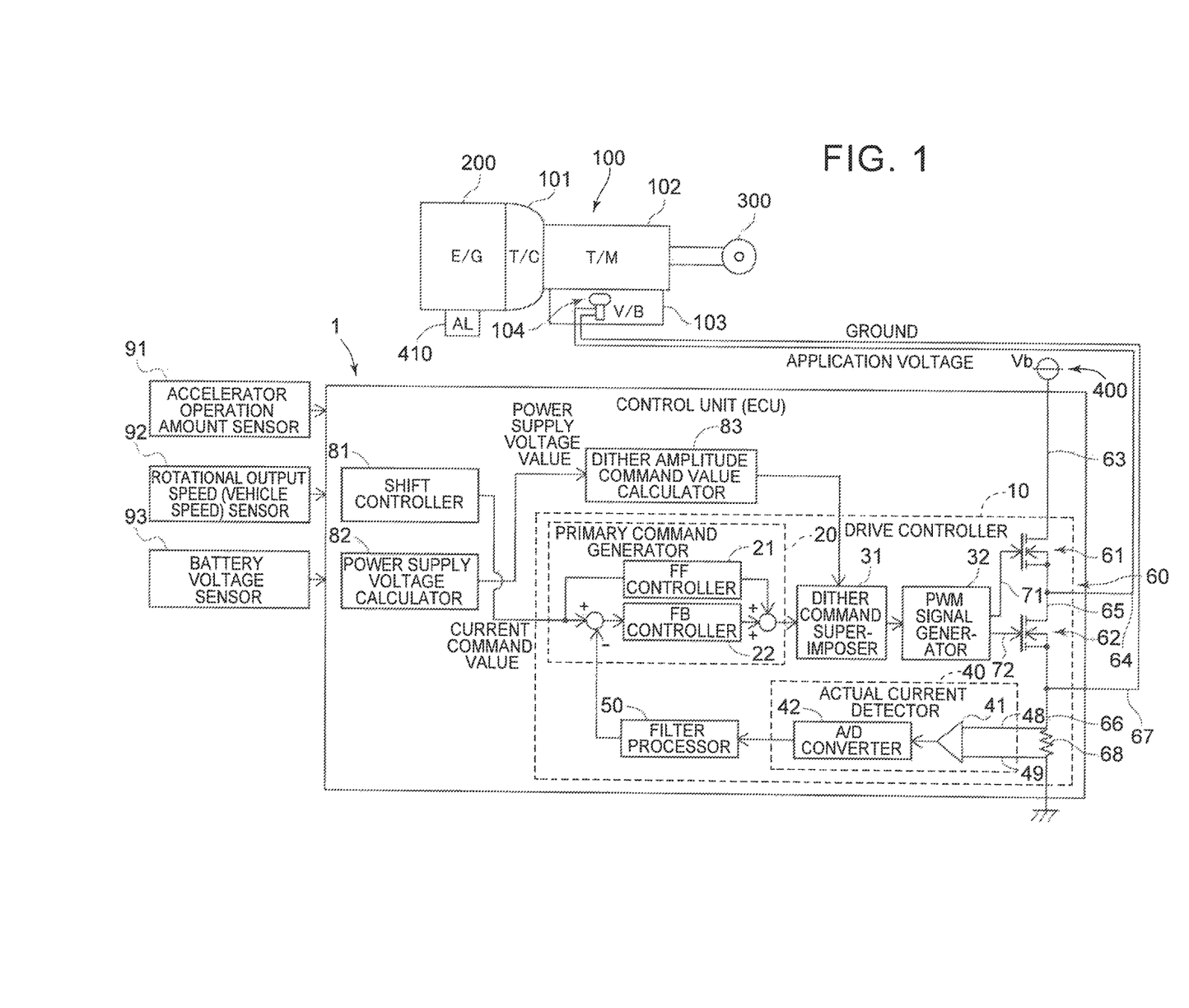
FIG. 1 is a block diagram illustrating a control device according to an embodiment.
Figure 2:
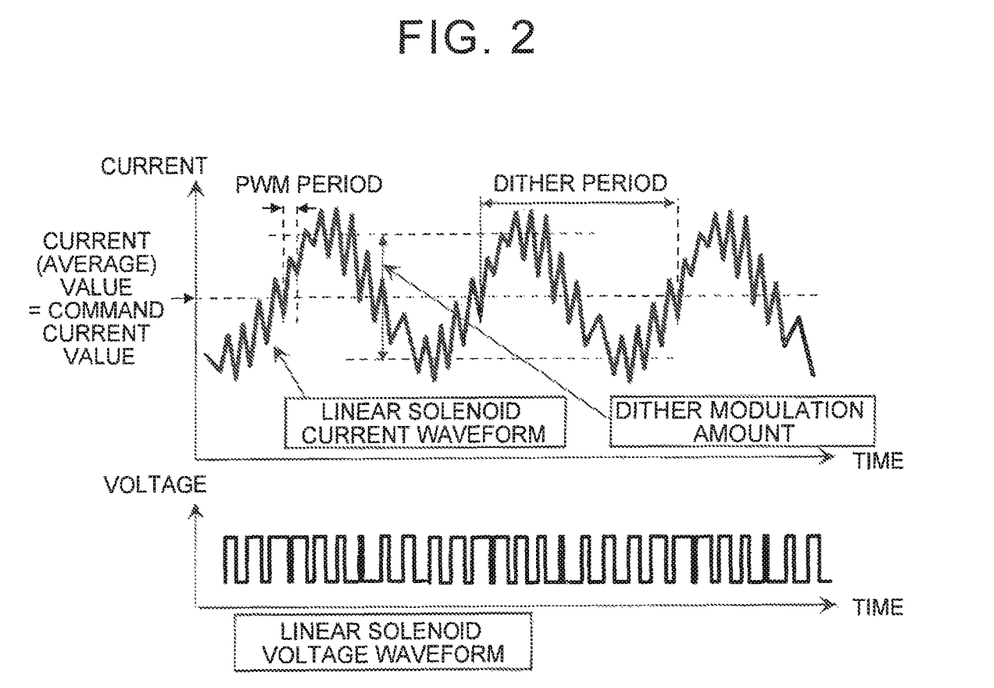

As illustrated in FIG. 1, the automatic transmission 100 includes the following: a torque converter (T/C) 101 drivingly coupled to an engine (E/G) 200 as a drive source; an automatic speed change mechanism (T/M) 102 that outputs rotational output of the torque converter 101 to wheels 300 while changing the speed of the rotational output; a hydraulic control device (V/B) 103 that controls hydraulic pressure including circulating hydraulic pressure in the torque converter 101, working hydraulic pressure supplied to a non-illustrated lockup clutch provided in the torque converter 101, working hydraulic pressure supplied to non-illustrated friction engagement elements (such as clutches and brakes) in the automatic speed change mechanism 102, and lubricating hydraulic pressure to supply lubricating oil to the automatic speed change mechanism 102; and the control unit (ECU) 1 that implements a control device described in detail later.

The hydraulic control device 103 has multiple linear solenoid valves including, for example, the following: a linear solenoid valve that regulates control pressure for controlling a regulator valve that regulates, to line pressure, hydraulic pressure of an oil pump driven by the engine 200 (or an electrically driven oil pump); a linear solenoid valve that regulates working hydraulic pressure supplied to the lockup clutch; and a linear solenoid valve that regulates working hydraulic pressure supplied to hydraulic servos of the friction engagement elements. For the sake of simplifying description, the embodiment describes an example where a lineae solenoid valve 104 that is one of them is controlled. The linear solenoid valve 104 has axially movable driven components including a plunger (not illustrated) at a solenoid portion and a spool (not illustrated) at a valve portion. The plunger is driven by being excited by a current flowing through a coil. The spool is driven by being pressed by the plunger and thus changes an amount by which each port is opened or closed. The purpose of the embodiment is to reduce sliding friction on the movable components (the plunger and the spool), especially to reduce sliding friction on the spool.

The automatic speed change mechanism 102 can be any type of speed change mechanism and may be a multi-stage speed change mechanism having a planetary gear or the like to achieve multiple speeds or may be a stepless speed change mechanism having a belt-type or toroidal-type stepless speed change mechanism. Although the example described in the embodiment includes the automatic transmission 100, the automatic transmission 100 may be replaced with a hybrid drive device that includes a rotating electric machine, such as a motor/generator, serving as a drive source. Furthermore, in either case of the automatic transmission 100 or the hybrid drive device, an idle-stop function may be allowed to stop the engine 200.

An alternator (AL) 410 driven by the engine 200 is provided near the engine 200, and electricity generated by the alternator 410 is supplied to a battery 400 to charge the battery 400. Although the battery 400 has a nominal voltage of, for example, 12 volts, the voltage of the battery 400 may rise to, for example, about 16 volts when the alternator 410 is driven. In contrast, the voltage of the battery 400 may drop to about nine volts when the amount of charge remaining in the battery 400 is small, such as when the engine 200 is stopped due to, for example, an idle-stop feature, or when the alternator 410 is stopped because the battery charge amount is large. For example, a step down circuit instead of the battery 400 may produce electricity to be used by stepping down a high voltage for driving a hybrid drive device.

Next, the structure of the control unit (ECU) is described. As illustrated in FIG. 1, the control unit (ECU) 1 is connected to sensors such as the following to receive signals therefrom: an accelerator operation amount sensor 91 that detects the operation amount of a non-illustrated accelerator (or a throttle operation amount sensor that detects the operation amount of a throttle); a rotational output speed sensor 92 that detects the speed of a rotational output of the automatic speed change mechanism 102 (or a vehicle sensor that detects the speed of a vehicle); and a battery voltage sensor 93 that detects the voltage of the battery 400.

The control unit 1 broadly includes a shift controller (a current command value generator) 81, a power supply voltage calculator 82, a dither amplitude command value calculator (a dither command calculator) 83, and a drive controller 10. The drive controller 10 includes a primary command generator 20, a dither command superimposer 31, a PWM signal generator 32, an actual current detector 40, a filter processor 50, and a drive circuit 60 including switching elements 61 and 62. Out of these, the shift controller 81, the power supply voltage calculator 82, and the dither amplitude command value calculator 83 are implemented by programs that are stored in a ROM or the like and that are executed by a CPU or the like.

On the other hand, the drive controller 10 is structured in one set as a so-called drive control board. Multiple drive controllers corresponding one-to-one to the multiple linear solenoid valves are arranged in the control unit 1, and one dither amplitude command value calculator outputs signals to the multiple drive controllers. For the sake of simplifying description, one drive controller 10 is taken as an example and described. According to the embodiment, the primary command generator 20, the dither command superimposer 31, the PWM signal generator 32, the actual current detector 40, the filter processor 50, and the drive circuit 60 are implemented by physical electric circuits (hardware) that archive their respective functions. Alternatively; they may be implemented by software when they are implementable, without physical electric circuits, by programs that are stored in a ROM or the like and that are executed by a CPU or the like.

Next, the function of each portion of the control unit 1 is described. The shift controller 81 generates a current command value Icmd for a current supplied to each of the linear solenoid valves by making a shift determination on the basis of the accelerator operation amount detected by the accelerator operation amount sensor 91 and the vehicle speed detected by the rotational output speed sensor 92, i.e., by determining Which of the friction engagement elements to engage or whether to make switching between engagement and disengagement of the friction engagement elements. It is noted that an update period of the current command value Icmd generated by the shift controller 81 is longer than a period (a dither period) of a dither command voltage value Vdiz that is described later.

On the basis of a voltage detection value Vbd of the battery (a power supply) 400 detected by the battery voltage sensor 93, the power supply voltage calculator 82 calculates a power supply voltage as a power supply voltage value Vbac that is a digital value. When calculating the power supply voltage valine Vbac, the power supply voltage calculator 82 may recalculate the power supply voltage value Vbac so as to correct the voltage detection value Vbd of the battery 400 in accordance with the rotational speed of the engine 200 and the operating state of the alternator 410.

The dither amplitude command value calculator 83 receives the power supply voltage value Vbac calculated by the power supply voltage calculator 82 and calculates an amplitude (hereinafter referred to as a dither amplitude) on the basis of the power supply voltage value Vbac while calculating its period (hereinafter referred to as a dither period), thereby generating a dither command voltage value Vdiz for causing a periodic voltage oscillation. The dither amplitude and the dither period of the dither command voltage value Vdiz are described in detail later.

On the other hand, the primary command generator 20 includes the following: a FB controller 22 that feedback-controls the current command value Icmd received from the shift controller 81 on the basis of an actual current value Ir that is detected by the actual current detector 40 and that is the actual value of a current flowing through the linear solenoid valve 104; and a FF controller 21 that performs feedforward control on the basis of the current command value Icmd received from the shift controller 81. According to the embodiment, the FB controller 22 uses PID control, calculates a sum of a proportional term (P) by proportional action, an integral term (I) by integral action, and a derivative term (D) by derivative action, estimates a resistance value Ra of the linear solenoid valve 104 by dividing a primary command voltage value Vc1 calculated in a previous control cycle by the current command value Icmd, and outputs a feedback voltage value Vfb by multiplying the sum by the resistance value Ra. On the other hand, the FT controller 21 outputs a feedforward voltage value Vff by multiplying the current command value Icmd received from the shift controller 81 by the estimated resistance value Ra of the linear solenoid valve 104. The primary command generator 20 combines the feedback voltage value Vfb and the feedforward voltage value Vff to generate and output one primary command voltage value Vc1. The primary command voltage value Vc1 is a command voltage value on the basis of which the linear solenoid valve 104 is driven as intended.

The dither command superimposer 31 generates a secondary command voltage value Vc2 by superimposing the primary command voltage value Vc1 generated by the primary command generator 20 and the dither command voltage value Vdiz calculated by the dither amplitude command value calculator 83, i.e., by modulating the primary command voltage value Vc1 with the dither amplitude and the dither period.

On the basis of the secondary command voltage value Vc2 generated by the dither command superimposer 31, the PWM signal generator 32 generates a PWM signal having a modulated pulse width to be outputted in a predetermined period and outputs the PWM signal to the gate electrodes of the switching elements 61 and 62 of the drive circuit 60 described later. According to the embodiment, the period of the PWM signal is set smaller than the dither period. As the PWM signal has a smaller period, the linear solenoid valve 104 receives a command at a smaller interval. According, control accuracy is improved, and a response is improved.

The drive circuit (an application voltage generator) 60 includes the following: a current path 63 connected to the battery 400; the switching element 61, such as a MOSFIT element, interposed in the current path 63; a current path 71 that connects the PWM signal generator 32 and a gate electrode of the switching element 61; a current path 65 connected to the ground side of the current path 63; the switching element 62, such as a MOSFIT element, interposed in the current path 65; a current path 72 that connects the PWM signal generator 32 and a gate electrode of the switching element 62;

a current path 66 that connects the current path 65 and a ground; a current path 64 that branches off at a junction between the current path 63 and the current path 65 and that is connected to one end of a non-illustrated coil of the linear solenoid valve 104 to output an application voltage to the coil; and a current path 67 that branches off at a junction between the current path 65 and the current path 66 and that is connected to the other end of the non-illustrated coil of the linear solenoid valve 104 to ground the coil. Furthermore, a shunt resistor 68 is interposed in the current path 66. The switching elements 61 and 62 may be a bipolar transistor instead of a MOSFIT, or may be an IGBT element that is a combination of them.

In the drive circuit 60, when the switching element 61 is made ON (connected) and the switching element 62 is made OFF (disconnected) by the PWM signal from the PWM signal generator 32, a voltage Vb of the battery 400 is applied to the coil of the linear solenoid valve 104 through the current paths 63 and 64 while the coil of the linear solenoid valve 104 is grounded through the current paths 67 and 66, so that an electromotive current flows in accordance with an application voltage Va and the resistance value Ra of the linear solenoid valve 104. In contrast, when the switching element 62 is made ON (connected) and the switching element 61 is made OFF (disconnected) by the PWM signal from the PWM signal generator 32, the coil of the linear solenoid valve 104 is grounded through the current paths 66, 65, and 64, so that a counter electromotive current flows.

The actual current detector 40 detects the actual current value Ir flowed through the linear solenoid valve 104. Specifically, the actual current detector 40 includes the following: current paths 48 and 49 connected to different ends of the shunt resistor 68 interposed in the current path 66 connected to the ground; an operational amplifier 41 that detects a voltage difference between the current paths 48 and 49; and an A/D converter 42 that receives the voltage difference as an analog value detected by the operational amplifier 41, calculates the actual current value Ir flowed through the linear solenoid valve 104 from a resistance value Rs of the shunt resistor 68, converts the actual current value Ir into a digital value, and outputs the digital value.

The filter processor 50 is a band-rejection filter that cuts off a frequency corresponding to the dither period. The filter processor 50 filters the actual current value Ir received from the A/D converter 42, thus outputting the actual current value Jr having no dither modulation frequency to the FB controller 22. The filter processor 50 is structured to cot off at least the frequency of the dither command voltage value (hereinafter, referred to as a dither frequency) and may cut off noise components as well. As long as these functions are achieved, the filter processor 50 can be any type of filter, including a notch filter that cuts off the dither frequency, a high-pass filter that passes only frequencies higher than the dither frequency, and a bandpass filter that cuts off the dither frequency while passing frequencies within a necessary band.

Next, how the dither amplitude command value calculator 83 calculates the dither command voltage value Vdiz is described. According to the embodiment, as illustrated in FIG. 3, the dither amplitude command value calculator 83 calculates a limitation amount VdizLim to which the amplitude of the dither command voltage value Vdiz is limited by dividing the power supply voltage Vb by two, i.e., sets the amplitude of the dither command voltage value Vdiz (hereinafter, referred to as a dither amplitude) to half of the power supply voltage Vb. Thus, a dither modulation amount of the dither command voltage value Vdiz has the same range as the power supply voltage Vb. The dither command voltage value Vdiz is superimposed, as an application voltage to be applied to the linear solenoid valve 104, on a command voltage value (i.e., the primary command voltage value Vc1) based on the current command value Icmd. Thus, as illustrated in FIG. 3, a voltage actually applied to the linear solenoid valve 104 is a superimposed voltage that has the dither amplitude equal to the limitation amount VdizLim (the power supply voltage Vb/2) with respect to a value calculated by multiplying the resistance value Ra of the linear solenoid valve 104 and the actual current value Ir.

In this case, for example, if the dither modulation amount of the dither command voltage value Vdiz is not less than half of the power supply voltage Vb, the command value for the application voltage Va may become not less than the power supply voltage or may become less than zero volts, such as when the primary command voltage value Vc1 becomes half of the power supply voltage Vb. Changing the primary command voltage value Vc by changing the current command value Icmd under such conditions merely causes the command value for the application voltage Va to change in a range not less than the power supply voltage Vb or in a range less than zero volts, without causing the actual application voltage to change in the range not less than the power supply voltage Vb or in the range less than zero volts. Consequently, the average voltage remains unchanged, so that the actual current cannot change. Therefore, the feedback control cannot regulate the hydraulic pressure as intended. As described above, the range of the command value for the application voltage Va exceeding the range of the power supply voltage Vb makes it impossible to perform satisfactory control. For this reason, according to the embodiment, the dither amplitude is set to half of the power supply voltage Vb by dividing by two the power supply voltage value Vbac as an accurately calculated value of the voltage Vb of the battery 400.

When the dither amplitude is half of the power supply voltage Vb, for example, if the primary command voltage value Vc1 rises above half of the power supply voltage Vb, the command value for the application voltage Va may become not less than the power supply voltage Vb; or conversely, if the primary command voltage value Vc1 falls below half of the power supply voltage Vb, the command value for the application voltage Va may become less than zero volts. However, one of the upper and lower sides of the amplitude of the command value for the application voltage Va is within the range from zero volts to the power supply voltage Vb. Changing the primary command voltage value Vc by changing the current command value Icmd under such conditions causes one of the upper and lower sides of the amplitude to change, thus causing the actual average voltage to change. At this time, since the other of the upper and lower sides of the amplitude does not change, the amount of change in the average of the application voltage Va is small. However, the actual average voltage is feedback-controlled after being temporarily deviated from a target average voltage, so that the actual average of the application voltage Va is adjusted to the target average voltage. Thus, the hydraulic pressure is regulated as intended.

As described above, when the dither amplitude is not greater than half of the power supply voltage Vb, the application voltage Va is calculated as intended through the feedback control. Nevertheless, to achieve stability, it may be considered that the dither amplitude is made smaller to reduce voltage oscillation. However, this approach may reduce the current supplied to the linear solenoid valve 104 and reduce the movement of the spool accordingly, thus making it hard to achieve the effect of reducing the sliding friction on the spool. Although calculating each time a voltage value that achieves the effect of reducing the sliding friction is employable, this calculation becomes complicated when considering the spool position and the oil viscosity that depends on the oil temperature. Therefore, according to the embodiment, the dither amplitude is set to half of the power supply voltage Vb so that the effect of reducing the sliding friction is achieved and so that calculation in the feedback control is stabilized.

Figure 3:
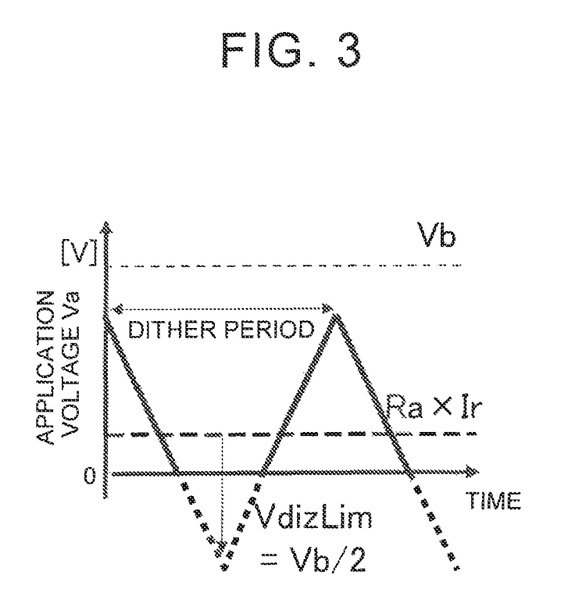
FIG. 3 is a timing chart illustrating a dither command voltage value.

Furthermore, according to the embodiment, as illustrated in FIG. 3, the dither amplitude command value calculator 83 calculates and sets the period (hereinafter, referred to as the dither period) of the dither command voltage value Vdiz such that the dither period is a predetermined multiple of the period of the PWM signal, specifically, for example, eight times greater than the period of the PWM signal, as described in detail later. Moreover, the dither period is set shorter than the update period of the current command value Icmd generated by the shift controller 81. In other words, the update period of the current command value Icmd is set longer than the dither period.

Assuming that the period of the PWM signal is about eight times greater as in the related art, the period of the PWM signal is substantially equal to the dither period. In this case, even when no dither modulation amount is superimposed, the spool of the linear solenoid valve 104 is driven like with the dither period, so that the sliding friction is reduced. However, improving responsiveness of the linear solenoid valve 104, i.e., improving hydraulic responsiveness requires making the period of the PWM signal smaller. As the period of the PWM signal is smaller, the driving amplitude of the spool is smaller. Consequently, the effect of reducing the sliding friction is not achieved if no measures are taken. That is why, according to the embodiment, the period of the PWM signal is reduced such that the dither period is set to a predetermined multiplication of the period of the PWM signal accordingly.

Furthermore, the update period of the current command value Icmd is set longer than the dither period. This allows the current command value Icmd to change while the plunger and the spool of the linear solenoid valve 104 are moving slightly, thus improving responsiveness.

As described above, the dither command voltage value Vdiz is calculated by the dither amplitude command value calculator 83, is superimposed on the primary command voltage value Vc1 calculated on the basis of the received current command value Icmd, and is generated as the PWM signal. The voltage applied to the linear solenoid valve 104 on the basis of the PWM signal has a voltage waveform (a linear solenoid voltage waveform) that is pulse-width modulated as illustrated in FIG. 2. Thus, as illustrated in FIG. 2, the actual current value Ir flowing through the linear solenoid. valve 104 has a waveform (a linear solenoid current waveform) that oscillates with the dither period in the range of the dither modulation amount with average of (with respect to) the current command value Icmd and that fluctuates with the PWM period.

As described above, in the control unit 1 according to the embodiment, the primary command generator 20 generates the primary command voltage value Vc1 by feeding back the current command value Icmd on the basis of the actual current value Ir While feeding forward the current command value Icmd, and then the dither command voltage value Vdiz calculated by the dither amplitude command value calculator 83 is superimposed, as a voltage value not a current value, on the primary command voltage value Vc1. This eliminates the need, for example, for the shift controller 81, to calculate the current command value by taking into account the dither modulation amount, thus making it possible to reduce the bit width (the number of bits) of the current command value. Furthermore, this eliminates the need, for example, for the shift controller 81, to calculate the current command value by taking into account that the current command value is fed back or fed forward, thus making it possible to reduce the amount of calculation. As such, this eliminates the need to increase the size of a chip, such as a CPU, thus making it possible to achieve a cost reduction.

[Summary of the Embodiment]

A control device (1) according to the embodiment electrically controls a solenoid valve (104) and includes: an actual current detector (40) that detects an actual current value flowing through the solenoid valve (104); a primary command generator (40) that receives a current command value and the actual current value detected by the actual current detector (40) and that generates a primary command voltage value while feeding back the current command value on the basis of the actual current value; a dither command calculator (83) that calculates a dither command voltage value to cause a periodic voltage oscillation; a filter processor (50) that filters the actual current value detected by the actual current detector (40) to remove a frequency corresponding to a period of the dither command voltage value and that outputs the filtered actual current value to the primary command generator; a dither command superimposer (31) that generates a secondary command voltage value by superimposing the dither command voltage value generated by the dither command calculator (83) on the primary command voltage value generated by the primary command generator (20); a PWM signal generator (32) that converts the secondary command voltage value generated by the dither command superimposer (31) into a PWM signal; and an application voltage generator (60) that generates, on the basis of the PWM signal generated by the PWM signal generator (32), an application voltage to be applied to the solenoid valve (104).

Thus, conversion into the primary command voltage value is performed by feeding back the current command value Icmd on the basis of the actual current value flowing through the coil, and the dither command voltage value having the dither modulation amount that achieves the dither period is superimposed on the primary command voltage value. This allows, while accurately controlling the linear solenoid valve, the dither command voltage value Vdiz to be calculated without taking into account that the actual current value Ir is fed back. As such, this reduces calculation load and eliminates the need to increase the size of a chip, such as the CPU of the control unit 1, thus making it possible to achieve a cost reduction.

Furthermore, the control device (1) according to the embodiment includes a power supply voltage calculator (82) that calculates a voltage of a power supply (400), and the dither command voltage value calculated by the dither command value calculator (83) has an amplitude not greater than half of the voltage of the power supply.

This ensures that the dither command voltage value Vdiz is not greater than half of the power supply voltage Vb, thus preventing the amplitude of the secondary command voltage value Vc2 having the primary command voltage value Vc1 superimposed thereon from exceeding the range (0 to Vb) of the power supply voltage Vb and stabilizing calculation in the feedback control.

Furthermore, in the control device (1) according to the embodiment, the period of the dither command voltage value calculated by the dither command value calculator (83) is longer than a period of the PWM signal.

This makes it possible to achieve the effect of reducing the sliding friction on the spool while reducing the period of the PWM signal to improve responsiveness of the linear solenoid valve 104.

Specifically, in the control device (1) according to the embodiment, the period of the dither command voltage value calculated by the dither command value calculator (83) is a predetermined multiple of the period of the PWM signal.

Furthermore, the control device (1) according to the embodiment includes a current command value generator (81) that generates the current command value, and the current command value calculated by the current command value generator (81) has a period longer than a period with which the dither command voltage value is calculated.

As such, the update timing of the current command value becomes longer than the dither period. This allows the current command value to change while the linear solenoid valve 104 is moving slightly, thus improving the responsiveness.

Furthermore, the control device (1) according to the embodiment includes a drive control board (10) having an electric circuit that implements the actual current detector (40), the primary command generator (20), the dither command superimposer (31), the filter processor (50), the PWM signal generator (32), and the application voltage generator (60), and a program that implements the dither command value calculator (83) is executed to output the dither command voltage value to the drive control board (10).

[Possibility of Other Embodiments]

Although the control device according to the embodiment described above is used to control a linear solenoid valve in an automatic transmission, the disclosure is not limited to the embodiment and is applicable to any control device that controls a solenoid valve.

Although according to the embodiment, the command voltage value is generated by feeding forward the current command value, only feedback may be performed without performing feedforward. Furthermore, although PID control is taken as an example to describe the feedback control, the feedback control is not limited to PID control and may use PI control only. Any type of feedback control that can feed the actual current value back to the current command value can be used.

INDUSTRIAL APPLICABILITY

The control device can be used to electrically control a solenoid valve that controls hydraulic pressure and, in particular, can be preferably used to eliminate the need to increase the size of a chip, such as a CPU, thus achieving a cost reduction.

The invention claimed is:

1. A control device for electrically controlling a solenoid valve, the control device comprising:
an electronic control, unit that is configured to:
  detect an actual current value flowing through the solenoid valve;
  receive a current command value and the actual current value detected and generate a primary command voltage value while feeding back the current command value on the basis of the actual current value;
  calculate a dither command voltage value to cause a periodic voltage oscillation;

filter the actual current value detected to remove a frequency corresponding to a period of the dither command voltage value and output the filtered actual current value;

generate a secondary command voltage value by superimposing the dither command voltage value generated on the primary command voltage value generated;

convert the secondary command voltage value generated into a PWM signal; and generate, on the basis of the PWM signal generated, an application voltage to be applied to the solenoid valve.

2. The control device according to claim 1, wherein the electronic control unit calculates a power supply voltage, and the dither command voltage value calculated has an amplitude not greater than half of the power supply voltage.

3. The control device according to 2, wherein the period of the dither command voltage value calculated is longer than a period of the PWM signal.

4. The control device according to claim 3, wherein the period of the dither command voltage value is a predetermined multiple of the period of the PWM signal.

5. The control device according to claim 4, wherein the electronic control unit generates the current command value, and the current command value calculated has a period longer than a period with which the dither command voltage value is calculated.

6. The control device according to claim 5, wherein. electronic control unit includes an electric circuit that implements the functions of the electronic control unit, and the electronic control unit stores a program that implements the functions of the electronic control unit.

7. The control device according to claim 2, wherein the electronic control unit includes an electric circuit that implements he functions of the electronic control unit, and the electronic control unit stores a program that implements the functions of the electronic control unit.

8. The control device according to claim 3, wherein the electronic control unit includes an electric circuit that implements the functions of the electronic control unit, and the electronic control unit stores a program that implements the functions of the electronic control unit.

9. The control device according to claim 3, wherein the electronic control unit generates the current command value, and the current command value calculated has a period longer than a period with which the dither command voltage value is calculated.

10. The control device according to claim 9, wherein the electronic control unit includes an electric circuit that implements the functions of the electronic control unit, and the electronic control unit stores a program that implements the functions of the electronic control unit.

11. The control device according to claim 4, wherein the electronic control unit includes an electric circuit that implements the functions of the electronic control unit, and the electronic control unit stores a program that implements the functions of the electronic control unit.

12. The control device according to claim 1, wherein the period of the dither command voltage value calculated is longer than a period of the PWM signal.

13. The control device according to claim 12, wherein the period of the dither command voltage value calculated is a predetermined multiple of the period of the PWM signal.

14. The control device according to claim 13, Wherein the electronic control unit generates the current command value, and the current command value calculated has a period longer than a period with which the dither command voltage value is calculated.

15. The control device according to claim 14, wherein the electronic control unit includes an electric circuit that implements the functions of the electronic control unit, and the electronic control unit stores a program that implements the functions of the electronic control unit.

16. The control device according to claim 12, wherein the electronic control unit includes an electric circuit that implements the functions of the electronic control unit, and the electronic control unit stores a program that implements the functions of the electronic control unit.

17. The control device according to claim 12, wherein the electronic control unit generates the current command value, and the current command value calculated has a period longer than a period with which the dither command voltage value is calculated.

18. The control device according to claim 17, wherein the electronic control unit includes an electric circuit that implements the functions of the electronic control unit, and the electronic control unit stores a program that implements the functions of the electronic control unit.

19. The control device according to claim 13, wherein the electronic control unit includes an electric circuit that implements the functions of the electronic control unit, and the electronic control unit stores a program that implements the functions of the electronic control unit.

20. The control device according to claim 1, wherein the electronic control unit includes an electric circuit that implements the functions of the electronic control unit, and the electronic control unit stores a program that implements the functions of the electronic control unit.

* * * * *